(12) United States Patent
Guo et al.

(10) Patent No.: US 12,039,971 B2
(45) Date of Patent: Jul. 16, 2024

(54) METHOD, APPARATUS, ELECTRONIC DEVICE AND STORAGE MEDIUM FOR SEMANTIC RECOGNITION

(71) Applicant: Beijing Xiaomi Pinecone Electronics Co., Ltd., Beijing (CN)

(72) Inventors: Yuankai Guo, Beijing (CN); Bin Wang, Beijing (CN); Liang Shi, Beijing (CN); Yulan Hu, Beijing (CN); Erli Meng, Beijing (CN); Shuo Wang, Beijing (CN); Yingzhe Wang, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 126 days.

(21) Appl. No.: 17/132,443

(22) Filed: Dec. 23, 2020

(65) Prior Publication Data

US 2021/0407495 A1  Dec. 30, 2021

(30) Foreign Application Priority Data

Jun. 30, 2020  (CN) .......................... 202010623916.8

(51) Int. Cl.
G10L 15/08   (2006.01)
G06F 40/30   (2020.01)
G10L 15/04   (2013.01)

(52) U.S. Cl.
CPC .............. *G10L 15/08* (2013.01); *G06F 40/30* (2020.01); *G10L 15/04* (2013.01); *G10L 2015/088* (2013.01)

(58) Field of Classification Search
CPC .......... G10L 15/08; G10L 15/04; G06F 40/30
See application file for complete search history.

(56) References Cited

U.S. PATENT DOCUMENTS 9,972,304  B2 *  5/2018  Paulik ...................... G10L 15/01
10,387,575 B1 *  8/2019  Shen ........................ G06F 17/27

(Continued)

FOREIGN PATENT DOCUMENTS

CN  101777042 A  7/2010
CN  109313719 A  2/2019
(Continued)

OTHER PUBLICATIONS

Danqi Chen et al: "A Fast and Accurate Dependency Parser using Neural Networks", Proceedings of The 2014 Conference Onempirical Methods in Natural Language Processing (EMNLP), Jan. 1, 2014 (Jan. 1, 2014), pp. 740-750, XP055383331, Stroudsburg, PA, USA DOI: 10.3115/v1/D14-1082 * sections 1-3 *.

(Continued)

*Primary Examiner* — Richemond Dorvil
*Assistant Examiner* — Ethan Daniel Kim
(74) *Attorney, Agent, or Firm* — Syncoda LLC; Feng Ma

(57) ABSTRACT

A method for semantic recognition includes: in response to performing semantic analysis on information acquired by a terminal, a sentence to be processed is acquired; word recognition is performed on the sentence, to obtain a plurality of words and part-of-speech information corresponding to each of the words; a target set update operation is determined with a word processing model, according to one or more words to be input, part-of-speech information of the words to be input, and a dependency relationship of a first word. The word processing model is configured to calculate first and second feature vectors according to a word feature vector of the words to be input, a part-of-speech feature vector of the part-of-speech information and a relationship feature vector of the dependency relationship of the first word, calculate confidence levels of the preset set update operations according to the first feature vector and the second feature vector.

18 Claims, 9 Drawing Sheets

(56) References Cited

U.S. PATENT DOCUMENTS

| | | | |
|---|---|---|---|
| 11,238,227 B2* | 2/2022 | Velikovich | G10L 15/22 |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0189638 A1* | 7/2018 | Nurvitadhi | G06N 3/063 |
| 2019/0073351 A1 | 3/2019 | Zhang et al. | |
| 2020/0042596 A1* | 2/2020 | Ravi | G06F 17/27 |
| 2020/0160836 A1* | 5/2020 | Chen | G10L 15/00 |
| 2020/0242126 A1* | 7/2020 | Kalukin | G06F 16/332 |
| 2020/0311077 A1* | 10/2020 | Zhang | G06F 16/2453 |
| 2021/0005182 A1* | 1/2021 | Han | G10L 15/16 |
| 2021/0042604 A1 | 2/2021 | Hashimoto et al. | |

FOREIGN PATENT DOCUMENTS

| | | |
|---|---|---|
| CN | 109923557 A | 6/2019 |
| CN | 111339751 A | 6/2020 |
| EP | 3394798 A1 | 10/2018 |
| WO | 2020001373 A1 | 1/2020 |

OTHER PUBLICATIONS

Liu Hang et al: "A Sequence-to-Action Architecture for Character-Based Chinese Dependency Parsing with Status History", Sep. 30, 2019 (Sep. 30, 2019), Advances in Intelligent Data Analysis Xix; [ Lecture Otes in Computer Science; Lect. Notes Computer], Springer International Publishing, Cham, pp. 318-326, XP047521748, ISSN: 0302-9743, ISBN: 978-3-030-71592-2, [ retrieved on Sep. 30, 2019] *sections 1 and *.

Timothy Dozat et al: "Deep Biaffine Attention for Neural Dependency Parsing", arxiv.org, Cornell University Library, 201OLIN Library Cornell University Ithaca, NY148536, Nov. 2016 (Nov. 6, 2016), XP080729700, * the whole document *.

European Search Report in the European application No. 20217110. 4, mailed on Jun. 7, 2021.

Guo Zhen et al., "Character-level Dependency Model for Joint Word Segmentation, POS Tagging, and Dependency Parsing in Chinese", Journal of Chinese Information Processing, vol. 28, No. 6, Nov. 2014, the whole document. 9 pages with English abstract.

* cited by examiner

| Identification | Word | Part-of-speech information |
|---|---|---|
| 0 | 那(The) | R（Pronoun） |
| 1 | 只 | Q（Quantifier） |
| 2 | 棕色(brown) | N（Noun） |
| 3 | 的 | U（Auxiliary word） |
| 4 | 狐狸(fox) | N（Noun） |
| 5 | 边 | D（Adverb） |
| 6 | 叫(cried) | V（Verb） |
| 7 | 边(and) | D（Adverb） |
| 8 | 跳入(jumped into) | V（Verb） |
| 9 | 了 | U（Auxiliary word） |
| 10 | 草丛(the grass) | N（Noun） |

METHOD, APPARATUS, ELECTRONIC DEVICE AND STORAGE MEDIUM FOR SEMANTIC RECOGNITION

CROSS-REFERENCE TO RELATED APPLICATION

This application claims priority to Chinese Patent Application No. 202010623916.8 filed on Jun. 30, 2020, the disclosure of which is hereby incorporated by reference in its entirety.

BACKGROUND

With the continuous development of artificial intelligence, the requirements for the accuracy of semantic recognition become higher and higher. Semantic recognition is one of the important components of Natural Language Processing (NLP) technology. In the natural language processing, a framework that uses dependency relationship between words (that is, a dominant relationship between words) to describe the language structure is called dependency syntax, and a syntactic analysis utilizing the dependency syntax is one of the key techniques in natural language processing. The dependency syntax analysis aims to transform a sentence from a sequence of the words into a graph structure (usually a tree structure) according to a certain grammatical system, so as to reveal the subordination between the words and provide key information for the semantic recognition.

SUMMARY

The present disclosure generally relates to the field of natural language processing, and more particularly, to a method and an apparatus for semantic recognition, an electronic device and a computer storage medium.

To overcome the problems in related technologies, a method and an apparatus for semantic recognition, an electronic device, and a computer storage medium are provided by the present disclosure.

According to a first aspect of the embodiments of the present disclosure, there is provided a method for semantic recognition, the method including:

in response to performing semantic analysis on information acquired by a terminal, acquiring a sentence to be processed;

performing word recognition on the sentence to be processed, to obtain a plurality of words and part-of-speech information corresponding to each of the plurality of words;

determining, with a pre-trained word processing model, a target set update operation corresponding to a set of words to be processed from a plurality of preset set update operations, according to one or more words to be input, part-of-speech information of the words to be input, and a dependency relationship of a first word;

wherein the set of words to be processed is a set of words to be processed currently in the plurality of words; the words to be input include a word to be processed in the set of words to be processed, the first word and a second word; the first word is a word that has been determined to have a dependency relationship with the word to be processed in the plurality of words; the second word includes a preset number of words following the word to be processed in the plurality of words;

wherein the word processing model is configured to: obtain a word feature vector of the words to be input, a part-of-speech feature vector of the part-of-speech information and a relationship feature vector of the dependency relationship of the first word; calculate, with a preset activation function, a first feature vector according to the word feature vector, the part-of-speech feature vector and the relationship feature vector; calculate a second feature vector according to the word feature vector, the part-of-speech feature vector and the relationship feature vector; and calculate confidence levels of the plurality of preset set update operations according to the first feature vector and the second feature vector;

performing a dependency relationship determination step cyclically according to the target set update operation, until obtaining a dependency parsing result of the sentence to be processed, wherein the dependency parsing result represents a dependency relationship among the plurality of words;

performing the semantic recognition on the sentence to be processed according to the dependency parsing result.

In some embodiments, determining, with a pre-trained word processing model, the target set update operation corresponding to the set of words to be processed from the plurality of preset set update operations, according to the words to be input, the part-of-speech information of the words to be input, and the dependency relationship of the first word, includes:

inputting the words to be input, the part-of-speech information of the words to be input, and the dependency relationship of the first word into the word processing model, to obtain the confidence levels, each corresponding to a respective one of the plurality of preset set update operations;

taking a preset set update operation with a highest one of the confidence levels as the target set update operation.

In some embodiments, the word processing model comprises an input layer, an embedding layer, a hidden layer, a self-attention mechanism layer and an output layer; and inputting the words to be input, the part-of-speech information of the words to be input, and the dependency relationship of the first word into the word processing model, to obtain the confidence levels, each corresponding to a respective one of the plurality of preset set update operations, includes:

inputting, through the input layer, the words to be input, the part-of-speech information of the words to be input, and the dependency relationship of the first word into the embedding layer;

generating, through the embedding layer, the word feature vector, the part-of-speech feature vector and the relationship feature vector according to the words to be input, the part-of-speech information of the words to be input, and the dependency relationship of the first word, and splicing the word feature vector, the part-of-speech feature vector and the relationship feature vector to obtain a first splicing feature vector;

inputting, through the embedding layer, the first splicing feature vector, the part-of-speech feature vector and the relationship feature vector into both the hidden layer and the self-attention mechanism layer;

determining, through the hidden layer, a first feature vector with the preset activation function according to the first splicing feature vector, the part-of-speech feature vector and the relationship feature vector, and inputting the first feature vector into the output layer;

determining, through the self-attention mechanism layer, a second feature vector according to the first splicing feature vector, the part-of-speech feature vector and the relationship feature vector, and inputting the second feature vector into the output layer; and outputting, through the output layer, the confidence levels, each corresponding to a respective one of the plurality of preset set update operations, according to the first feature vector and the second feature vector.

In some embodiments, the dependency relationship determination step includes:

updating the set of words to be processed according to the target set update operation, to obtain an updated set of words; and determining a dependency relationship of the word to be processed in the set of words to be processed according to the target set update operation;

re-determining the words to be input, the part-of-speech information of the words to be input, and the dependency relationship of the first word according to the updated set of words;

determining, with the word processing model, a set update operation corresponding to the updated set of words from the plurality of preset set update operations, according to the redetermined words to be input, the redetermined part-of-speech information of the words to be input, and the redetermined dependency relationship of the first word;

taking the updated set of words as a new set of words to be processed, and taking the obtained set update operation corresponding to the updated set of words as a new target set update operation.

In some embodiments, the target set update operation comprises a shift operation, a first update operation, and a second update operation; wherein updating the set of words to be processed according to the target set update operation, to obtain the updated set of words; and determining the dependency relationship of the word to be processed from the set of words to be processed according to the target set update operation, includes:

in response to that the target set update operation is the first update operation, shifting a first-place word in two indicated words to be processed out of the set of words to be processed, and setting a dependency relationship between the two indicated words to be processed as a first dependency relationship, wherein the first dependency relationship indicates that a second-place word in the two indicated words is a subordinate word of the front word;

in response to that the target set update operation is the second update operation, shifting the first-place word in the two indicated words to be processed out of the set of words to be processed, and setting the dependency relationship between the two indicated words to be processed as a second dependency relationship, wherein the second dependency relationship indicates that the front word is the subordinate word of the second-place word in the two indicated words;

in response to that the target set update operation is the shift operation, taking a specified word of the plurality of words as a new word to be processed in the set of words to be processed.

In some embodiments, the preset activation function includes:

$$h = \tan h((w_1^w x^w + w_1^t x^t + w_1^l x^l + b)^3)$$

where h is the first feature vector, $w_1^w$ is a weight matrix corresponding to the first splicing feature vector, $w_1^t$ is a weight matrix corresponding to the part-of-speech feature vector, $w_1^l$ is a weight matrix corresponding to the relationship feature vector, $x^w$ is the first splicing feature vector, $x^t$ is the part-of-speech feature vector, $x^l$ is the relationship feature vector, b is a bias.

In some embodiments, determining the second feature vector according to the first splicing feature vector, the part-of-speech feature vector and the relationship feature vector, includes:

splicing the first splicing feature vector, the part-of-speech feature vector and the relationship feature vector to obtain a second splicing feature vector;

determining a target weight with a first formula according to the second splicing feature vector, wherein the first formula comprises:

$$S = f\left(\frac{X \cdot X}{\sqrt{d_x}}\right)$$

where X is the second splicing feature vector, S is the target weight, f is a softmax function, dx is a dimension of the second splicing feature vector; and determining the second feature vector with a second formula according to the second splicing feature vector and the target weight, wherein the second formula comprises:

$$L = S \cdot X$$

where L is the second feature vector.

In some embodiments, performing the word recognition on the sentence to be processed to obtain the plurality of words and the part-of-speech information corresponding to each of the plurality of words, includes:

performing word segmentation on the sentence to be processed to obtain a plurality of words to be recognized and part-of-speech information of each of the plurality of words to be recognized;

matching the plurality of words to be recognized with entity words in a preset word database;

performing word fusion on the words to be recognized according to the matched entity words and part-of-speech information of the words to be recognized, to obtain the plurality of words and part-of-speech information corresponding to the each of the words According to a second aspect of the embodiments of the present disclosure, there is provided an apparatus for semantic recognition, the apparatus including:

an acquiring portion, configured to in response to that semantic analysis is being performed on information acquired by a terminal, acquire a sentence to be processed;

wherein the acquiring portion is further configured to perform word recognition on the sentence to be processed, to obtain a plurality of words and part-of-speech information corresponding to each of the plurality of words;

a determining portion, configured to determine, with a pre-trained word processing model, a target set update operation corresponding to a set of words to be processed from a plurality of preset set update operations, according to one or more words to be input, part-of-speech information of the words to be input, and a dependency relationship of a first word;

wherein the set of words to be processed is a set of words to be processed currently in the plurality of words; the words to be input include a word to be processed in the set of words to be processed, the first word and a second word; the first word is a word that has been determined to have a dependency relationship with the word to be processed in the plurality of words; the second word includes a preset number of words following the word to be processed in the plurality of words;

wherein the word processing model is configured to: obtain a word feature vector of the words to be input, a part-of-speech feature vector of the part-of-speech information and a relationship feature vector of the dependency relationship of the first word; calculate, with a preset activation function, a first feature vector according to the word feature vector, the part-of-speech feature vector and the relationship feature vector; calculate a second feature vector according to the word feature vector, the part-of-speech feature vector and the relationship feature vector; and calculate confidence levels of the plurality of preset set update operations according to the first feature vector and the second feature vector;

a performing portion, configured to perform a dependency relationship determination step cyclically according to the target set update operation, until obtaining a dependency parsing result of the sentence to be processed, wherein the dependency parsing result represents a dependency relationship among the plurality of words;

a recognition portion, configured to perform the semantic recognition on the sentence to be processed according to the dependency parsing result.

In some embodiments, the determining portion includes:

a first determining sub-portion, configured to input the words to be input, the part-of-speech information of the words to be input, and the dependency relationship of the first word into the word processing model, to obtain the confidence levels, each corresponding to a respective one of the plurality of preset set update operations;

a second determining sub-portion, configured to take a preset set update operation with a highest one of the confidence levels as the target set update operation.

In some embodiments, the word processing model includes an input layer, an embedding layer, a hidden layer, a self-attention mechanism layer and an output layer; and the first determining sub-portion is further configured to:

input, through the input layer, the words to be input, the part-of-speech information of the words to be input, and the dependency relationship of the first word into the embedding layer;

generate, through the embedding layer, the word feature vector, the part-of-speech feature vector and the relationship feature vector according to the words to be input, the part-of-speech information of the words to be input, and the dependency relationship of the first word, and splice the word feature vector, the part-of-speech feature vector and the relationship feature vector to obtain a first splicing feature vector;

input, through the embedding layer, the first splicing feature vector, the part-of-speech feature vector and the relationship feature vector into both the hidden layer and the self-attention mechanism layer;

determine, through the hidden layer, a first feature vector with the preset activation function according to the first splicing feature vector, the part-of-speech feature vector and the relationship feature vector, and input the first feature vector into the output layer;

determine, through the self-attention mechanism layer, a second feature vector according to the first splicing feature vector, the part-of-speech feature vector and the relationship feature vector, and input the second feature vector into the output layer; and output, through the output layer, the confidence levels, each corresponding to a respective one of the plurality of preset set update operations, according to the first feature vector and the second feature vector.

In some embodiments, the performing portion is configured to perform the dependency relationship determination step in the following manner:

updating the set of words to be processed according to the target set update operation, to obtain an updated set of words; and determining a dependency relationship of the word to be processed in the set of words to be processed according to the target set update operation;

re-determining the words to be input, the part-of-speech information of the words to be input, and the dependency relationship of the first word according to the updated set of words;

determining, with the word processing model, a set update operation corresponding to the updated set of words from the plurality of preset set update operations, according to the redetermined words to be input, the redetermined part-of-speech information of the words to be input, and the redetermined dependency relationship of the first word;

taking the updated set of words as a new set of words to be processed, and taking the obtained set update operation corresponding to the updated set of words as a new target set update operation.

In some embodiments, the target set update operation includes a shift operation, a first update operation, and a second update operation; and the performing portion is configured to:

in response to that the target set update operation is the first update operation, shift a front word in two indicated words to be processed out of the set of words to be processed, and set a dependency relationship between the two indicated words to be processed as a first dependency relationship, wherein the first dependency relationship indicates that a second-place word in the two indicated words is a subordinate word of the front word;

in response to that the target set update operation is the second update operation, shift the first-place word in the two indicated words to be processed out of the set of words to be processed, and set the dependency relationship between the two indicated words to be processed as a second dependency relationship, wherein the second dependency relationship indicates that the front word is the subordinate word of the second-place word in the two indicated words;

in response to that the target set update operation is the shift operation, take a specified word of the plurality of words as a new word to be processed in the set of words to be processed.

In some embodiments, the preset activation function includes:

$$h = \tan h((w_1^w x^w + w_1^t x^t + w_1^l x^l + b)^3)$$

where h is the first feature vector, $w_1^w$ is a weight matrix corresponding to the first splicing feature vector, $w_1^t$ is a weight matrix corresponding to the part-of-speech feature vector, $w_1^l$ is a weight matrix corresponding to the relationship feature vector, $x^w$ is the first splicing feature vector, $x^t$ is the part-of-speech feature vector, $x^l$ is the relationship feature vector, b is a bias.

In some embodiments, the first determining sub-portion is configured to:

splice the first splicing feature vector, the part-of-speech feature vector and the relationship feature vector to obtain a second splicing feature vector;

determine a target weight with a first formula according to the second splicing feature vector, wherein the first formula includes:

$$S = f\left(\frac{X \cdot X}{\sqrt{d_x}}\right)$$

where X is the second splicing feature vector, S is the target weight, f is a softmax function, dx is a dimension of the second splicing feature vector; and determine the second feature vector with a second formula according to the second splicing feature vector and the target weight, wherein the second formula includes:

$$L = S \cdot X$$

where L is the second feature vector.

In some embodiments, the acquiring portion comprises:

an acquiring sub-portion, configured to perform word segmentation on the sentence to be processed to obtain a plurality of words to be recognized and part-of-speech information of each of the plurality of words to be recognized;

a matching sub-portion, configured to match the plurality of words to be recognized with entity words in a preset word database;

wherein the acquiring sub-portion is further configured to perform word fusion on the words to be recognized according to the matched entity words and part-of-speech information of the words to be recognized, to obtain the plurality of words and part-of-speech information corresponding to the each of the words.

According to a third aspect of the embodiments of the present disclosure, there is provided an electronic device including:

a processor;

a memory storing a computer program executable by the processor;

wherein the processor is configured to perform operations of the method according to a first aspect of the embodiments of the present disclosure.

According to a fourth aspect of the embodiments of the present disclosure, there is provided a computer storage medium having stored thereon computer executable instructions that, when executed by a processor, cause operations of the method according to a first aspect of the embodiments of the present disclosure to be performed.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
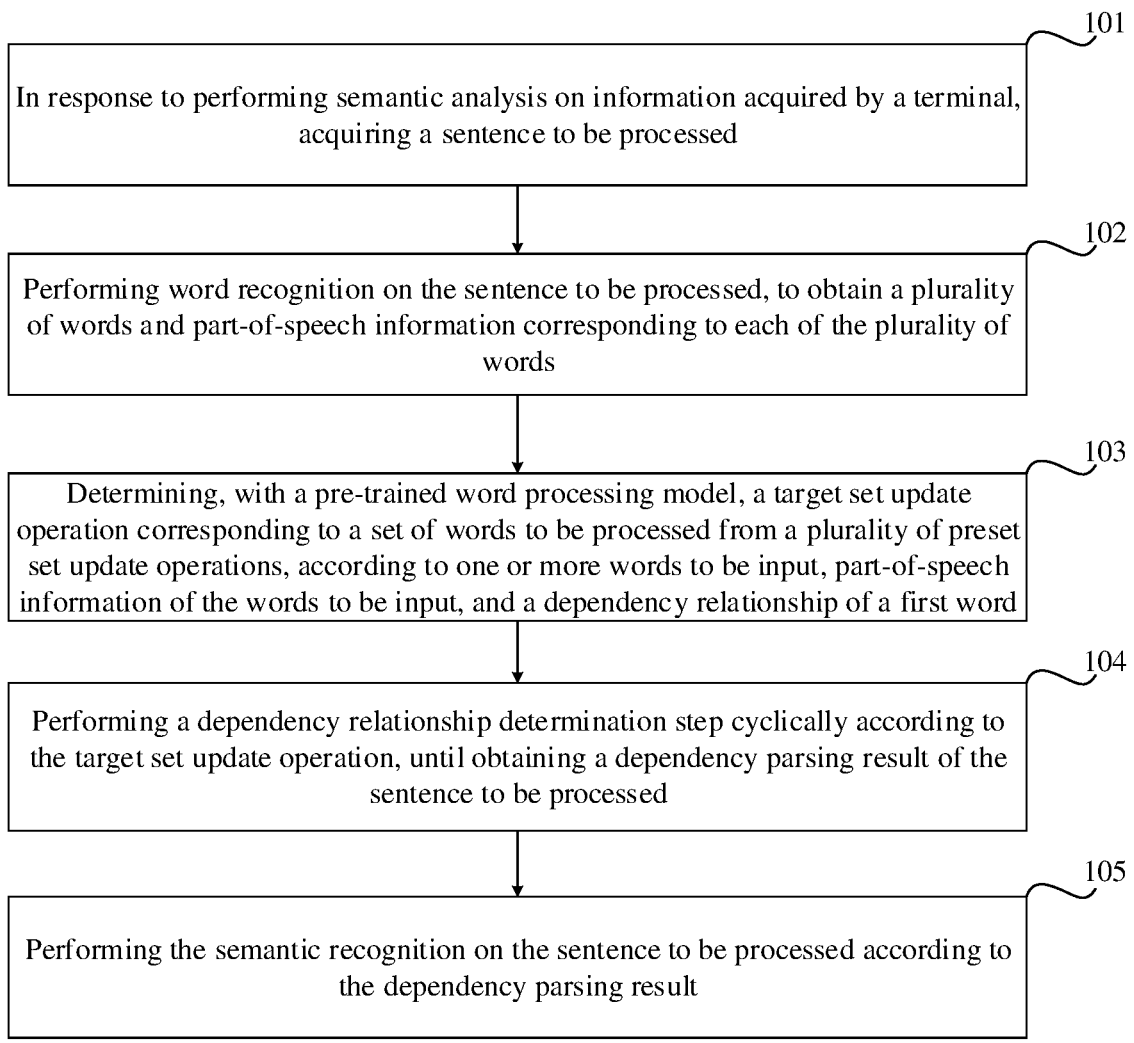
FIG. 1 is a flowchart showing a method for semantic recognition, according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

An application scenario for a method and an apparatus for semantic recognition, an electronic device, and a computer storage medium according to various embodiments may be first introduced. A semantic recognition scenario can be, for example, an event extraction, a sentiment analysis, a knowledge graph construction, a machine translation and other scenarios. In the scenario of semantic recognition, when performing semantic recognition on a sentence to be processed, dependency syntax analysis is required to determine a dependency relationships among main components of the sentence to be processed (for example, subject-predicate relationship, verb-object relationship).

A classifier can be mainly used to make a decision of transition actions (for example: shift action, convention action, etc.) through a method of the dependency syntax analysis based on the transition, and to build a dependency syntax tree through a series of transition actions. The classifier usually utilizes some traditional machine learning methods, which need to manually construct a feature template for determining the dependency relationship based on words, parts of speech, dependency relationships, word positions, and their combined features. However, the construction of the feature template requires constant attempts and adjustments, which will consume a lot of time and energy. At the same time, the traditional machine learning methods will affect the accuracy of the selected transition action as a result of limiting the feature template. Moreover, each time a transition action is selected, only the best transition action in the current state is considered, and the influence of subsequent states is not considered, which may lead to the selection of the wrong transition action, which reduces the accuracy of the dependency syntax analysis, and thus affects the accuracy of the semantic recognition.

Word recognition processing can be mainly performed on the sentence to be processed to obtain a plurality of words and part-of-speech information corresponding to each of the plurality of words, and the plurality of words are sequentially input into a set of words to be processed. Then, with the method of the dependency syntax analysis based on the transition, a word to be processed in the set of words to be processed, part-of-speech information corresponding to the word to be processed, and the word position of each word in the sentence to be processed are input into a word processing model. And a greedy algorithm is used to take a preset set update operation with a highest confidence level among a plurality of preset set update operations output by the word processing model as a target set update operation. After that, the target set update operation is performed to update the set of words to be processed, and the dependency relationship of the word to be processed is generated according to the target set update operation, and the generated dependency relationship is stored in a memory. Then the above steps of updating the set of words to be processed are repeated, until the dependency relationship among the plurality of words is determined. And then, a dependency syntax tree is built based on the dependency relationship among the plurality of words. Finally, semantic recognition of the sentence to be processed is performed with the dependency syntax tree.

This learning method can be optimized for each step of the target set update operation, and the context and operation type of each step of the target set update operation are combined as an example of classifier learning. The classifier can typically utilize some traditional machine learning methods, for example, Support Vector Machine (SVM), perceptron, maximum entropy or online learning algorithm. This learning method requires manual construction of feature templates for determining the dependency relationship based on words, parts of speech, dependency relationship, word position, and their combined features. The construction of feature templates requires constant attempts and adjustments, which consumes a lot of time and energy. At the same time, traditional machine learning methods have poor generalization performance and low anti-noise interference due to limited feature templates, and are prone to overfitting, resulting in low accuracy in selecting the target set update operation. Moreover, each time when the target set update operation is selected, only the dependency relationship of the word to be processed that is determined by the current word processing model is considered for selecting the target set update operation. It may result in a wrong target set update operation being selected, and then the accuracy of syntactic analysis is reduced, which affects the accuracy of the semantic recognition. For example, when the set of words to be processed includes two words to be processed, a word 1 and a word 2, that have a first dependency relationship (the word 2 to be processed is a subordinate word of the word 1 to be processed), the word 2 to be processed is shifted out of the set of words to be processed through the target set update operation. However, when a next word 3 to be processed that is input into the set of words to be processed is a subordinate word of the word 2 to be processed, it is impossible to determine a dependency relationship between the word 2 to be processed and the word 3 to be processed, as the word 2 to be processed has been shifted out of the set of words to be processed. Therefore, it results in a wrong dependency relationship between these two words.

Various embodiments of the present disclosure provide construction of the word processing model based on self-attention mechanism and activation function. Then, one or more words to be input, the part-of-speech information of the words to be input, and the dependency relationship of the first word are input into the word processing model to obtain the target set update operation, and the dependency parsing result is determined according to the target set update operation. Compared with the other technologies, the word processing model combines the features corresponding to the words to be input, the part-of-speech information of the words to be input, and the dependency relationship of the first word, without the need of manually constructing the feature templates. Meanwhile, the dependency relationship between a word subsequent to the word to be processed and the word to be processed is considered. Accordingly, the target set update operation can be selected accurately; the accuracy of the dependency parsing result can be improved, thereby improving the accuracy of the semantic recognition.

FIG. 1 is a flowchart showing a method for semantic recognition, according to some embodiments of the present disclosure. As shown in FIG. 1, the method includes the following steps.

In block 101, in response to performing semantic analysis on information acquired by a terminal, a sentence to be processed is acquired.

For instance, when performing a semantic analysis on information obtained by a terminal, the information obtained by the terminal may be identified to acquire a sentence to be processed. For example, when the information obtained by the terminal is text manually input by a user through the terminal, the text may be directly used as the sentence to be processed; when the information obtained by the terminal is a voice input by the user through the terminal, voice recognition can be performed on the voice, and a result of the voice recognition may be used as the sentence to be processed. Herein, the terminal may be a mobile terminal with a display interface, such as a smart phone, a tablet computer, a smart TV, a smart watch, a Personal Digital Assistant (PDA), a portable computer, etc. In some embodiments, the terminal may be a stationary terminal such as a desktop computer.

In block 102, word recognition on the sentence to be processed is performed, to obtain a plurality of words and part-of-speech information corresponding to each of the plurality of words;

For instance, after acquiring the sentence to be processed, word recognition can be performed on the sentence to be processed, to determine a plurality of words contained in the sentence to be processed and the part-of-speech information corresponding to each word. For example, a preset word segmentation algorithm can be used to segment the sentence to be processed, to obtain the plurality of words contained in the sentence to be processed. And then part-of-speech tagging is performed on the plurality of words to determine the part-of-speech information corresponding to each word. Herein, the preset word segmentation algorithm may be, for example, a Conditional Random Field algorithm (CRF algorithm).

In block 103, with a pre-trained word processing model, a target set update operation corresponding to a set of words to be processed is determined from a plurality of preset set update operations, according to one or more words to be input, part-of-speech information of the words to be input, and a dependency relationship of a first word.

Herein, the set of words to be processed is a set of words to be processed currently in the plurality of words; the words to be input include a word to be processed in the set of words to be processed, the first word and a second word; the first word is a word that has been determined to have a dependency relationship with the word to be processed in the plurality of words; and the second word includes a preset number of words following the word to be processed in the plurality of words.

The word processing model is configured to obtain a word feature vector of the words to be input, a part-of-speech feature vector of the part-of-speech information and a relationship feature vector of the dependency relationship of the first word; calculate, with a preset activation function, a first feature vector according to the word feature vector, the part-of-speech feature vector and the relationship feature vector; calculate a second feature vector according to the word feature vector, the part-of-speech feature vector and the relationship feature vector; and calculate confidence levels of the plurality of preset set update operations according to the first feature vector and the second feature vector.

In this step, first, a word sequence of the plurality of words may be determined according to the position of each word in the sentence to be processed. And the plurality of words are stored in the cache according to the word sequence of the plurality of words, for example, the plurality of words may be stored in the queue. After that, the plurality of words in the cache may be successively input into the set of words to be processed in the word sequence, as the words to be processed in the word set to be processed (initially, the set of words to be processed is empty, that is, there are no word to be processed in the set of words to be processed), until all the words in the cache are input into the set of words to be processed. The set of words to be processed may be understood as a work area, and the words to be processed are words that need to be determined in the work area. Herein, the set of words to be processed may be a stack or a double-ended queue, which is not specifically limited in the present disclosure.

Second, the word to be processed, the first word and the second word may be taken as the words to be input. The first word is a word that has been determined to have a dependency relationship with the word to be processed, and the second word, which is stored in the cache, includes a preset number of words following the word to be processed. For example, when the queue is used for caching, the first three words in the queue may be taken as the second word (that is, the preset number is 3). Then, the words to be input, the part-of-speech information of the words to be input, and the dependency relationship of the first word are input into the word processing model, to obtain the confidence levels, each corresponding to a respective one of the plurality of preset set update operations. Then, the preset set update operation having a highest confidence level is taken as a target set update operation corresponding to the set of words to be processed. Herein, the target set update operation is used to update the word to be processed in the set of words to be processed. For example, when the target set update operation is a shift action, the first word in the cache may be input into the set of words to be processed.

The way for the word processing model to obtain the confidence levels, each corresponding to a respective one of the plurality of preset set update operations may be as follows. After receiving the words to be input, the part-of-speech information of the words to be input, and the dependency relationship of the first word, the word processing model may generate the word feature vector of the words to be input, the part-of-speech feature vector of the words to be input and the relationship feature vector of the dependency relationship of the first word according to the words to be input, the part-of-speech information of the words to be input, and the dependency relationship of the first word, and splice the word feature vector, the part-of-speech feature vector and the relationship feature vector to obtain a first splicing vector. After that, the word processing model may combine, with a preset activation function, features of the obtained first splicing feature vector, the obtained part-of-speech feature vector and the obtained relationship feature vector automatically, to obtain a first feature vector. Meanwhile, the word processing model may further extract, by using a self-attention mechanism, features from the obtained first splicing vector, the obtained part-of-speech feature vector and the obtained relationship feature vector, to obtain a second feature vector. Finally, the word processing model may calculate and output the confidence levels of the plurality of preset set update operations according to the first feature vector and the second feature vector, each confidence level corresponding to a respective one preset set update operation.

In block 104, a dependency relationship determination step is performed cyclically, according to the target set update operation, until obtaining a dependency parsing result of the sentence to be processed, wherein the dependency parsing result represents a dependency relationship among the plurality of words.

Further, after the target set update operation corresponding to the set of words to be processed is determined, a dependency determination step may be executed cyclically according to the target set update operation, to continuously update the set of words to be processed. That is, each time the target set update operation corresponding to the current set of words to be processed is determined, the set of words to be processed is updated according to the target set update operation. For example, a certain word to be processed in the set of words to be processed may be shifted out of the set of words to be processed, or a new word may be obtained from the cache as the word to be processed. Then, the dependency relationship of the word to be processed in the set of words to be processed is determined according to the target set update operation, and the dependency relationship is stored in the memory until a dependency parsing result of the sentence to be processed is obtained. Herein, the dependency relationship includes: subordination relationship and relationship type. The relationship type may include, for example, a root node (ROOT) for representing a head of the sentence to be processed, a subject-verb (SBV) relationship, a verb-object (VOB) relationship, an attribute (ATT) relationship, a adverbial (ADV) relationship, and a right adjunct (RAD) relationship and the like. If the words in the cache are all regarded as the words to be processed in the set of words to be processed, and the above-mentioned dependency relationship determination step is executed, it is determined that the judgment of the dependency relationship of all words is completed, and the dependency parsing result is obtained.

In block 105, the semantic recognition is performed on the sentence to be processed according to the dependency parsing result.

Figures 2A, 2B:
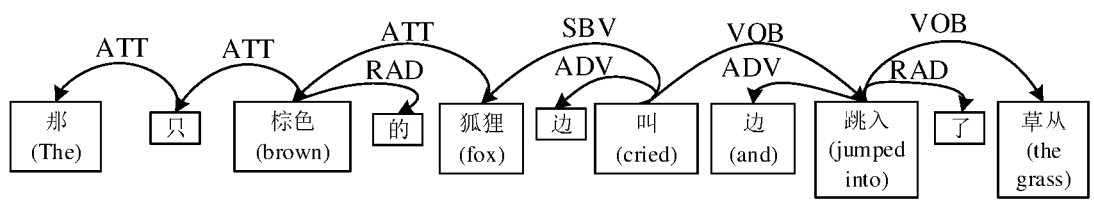
FIG. 2A is a schematic diagram illustrating a dependency syntax tree of some embodiments of the present disclosure shown in FIG. 1.
FIG. 2B is a schematic diagram illustrating a stack composed of words recognized in the sentence to be processed shown in FIG. 2A and part-of-speech information corresponding thereto.

For instance, after determining the dependency parsing result, the semantic recognition on the sentence to be processed may be performed according to the dependency parsing result. For example, when the dependency parsing result is a dependency syntax tree composed of the dependency relationship of every two words in a plurality of words, as shown in FIG. 2A (an arrow between two words in FIG. 2A represents the subordination relationship between the two words, the origin node of the arrow is a parent node, and the arrow points to a child node, and the word corresponding to the child node is the subordinate word of the corresponding word of the parent node, the tag on the arrow is the relationship type between these two word), the dependency parsing result may be output in CoNLL format, and the semantic recognition may be performed according to the dependency tree to accurately determine the semantics of the sentence to be processed.

By adopting the above technical solutions, one or more words to be input, the part-of-speech information of the words to be input, and the dependency relationship of the first word are input into the word processing model to obtain the target set update operation, and the dependency parsing result is determined according to the target set update operation. Compared with other technologies, the word processing model combines the features corresponding to the words to be input, the part-of-speech information of the words to be input, and the dependency relationship of the first word, without the need of manually constructing the feature templates. Meanwhile, the dependency relationship between a word subsequent to the word to be processed and the word to be processed is considered. Accordingly, the target set update operation can be selected accurately; the accuracy of the dependency parsing result can be improved, thereby improving the accuracy of the semantic recognition.

Figure 3:
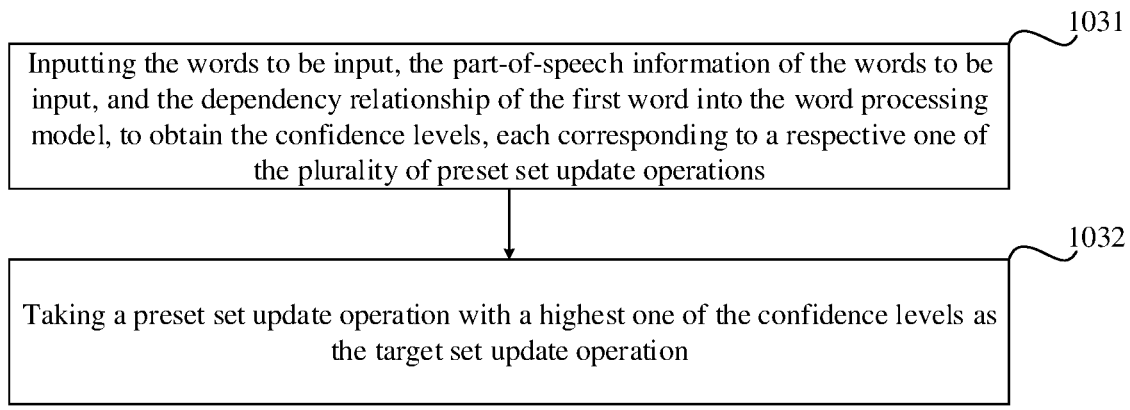
FIG. 3 is a flowchart showing a block 103 of some embodiments of the present disclosure shown in FIG. 1.

FIG. 3 is a flowchart showing a block 103 of some embodiments of the present disclosure shown in FIG. 1. As shown in FIG. 3, the method includes the following steps.

In block 1031, the words to be input, the part-of-speech information of the words to be input, and the dependency relationship of the first word are input into the word processing model, to obtain the confidence levels, each corresponding to a respective one of the plurality of preset set update operations.

Figure 4:
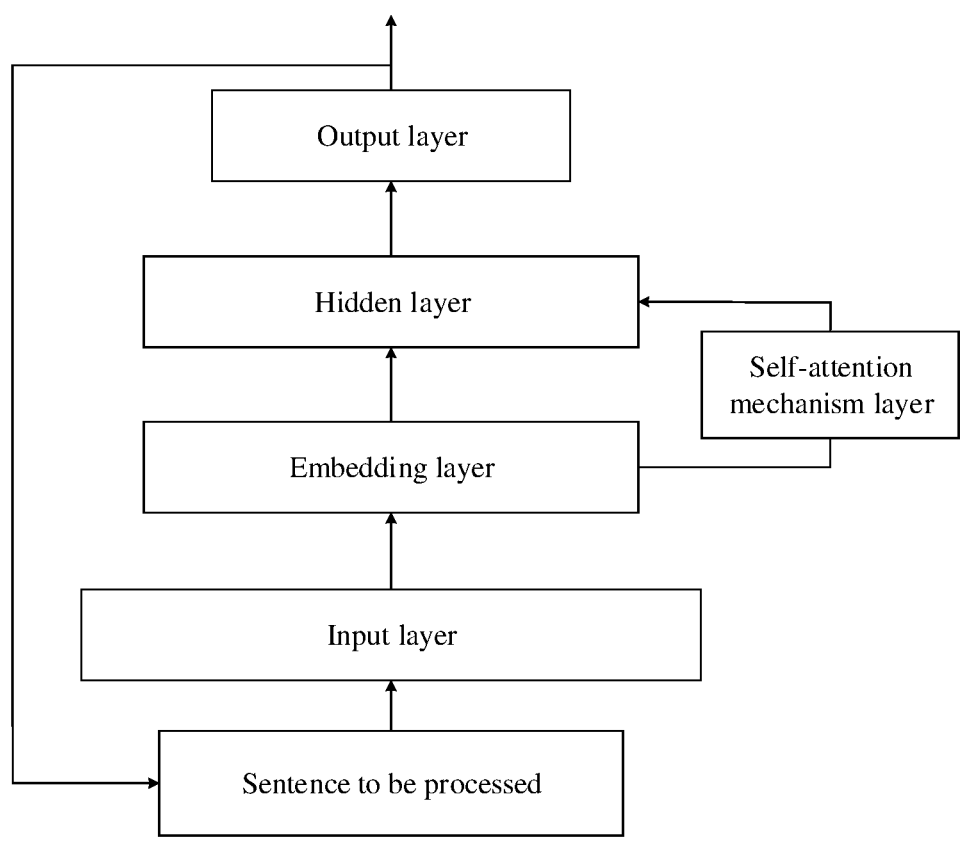
FIG. 4 is a schematic diagram illustrating a word processing model of some embodiments of the present disclosure shown in FIG. 1.

For instance, as shown in FIG. 4, the word processing model includes an input layer, an embedding layer, a hidden layer, a self-attention mechanism layer and an output layer. After the plurality of words and the part-of-speech information corresponding to each of the plurality of words are obtained, the words to be input, the part-of-speech information of the words to be input, and the dependency relationship of the first word may be input into the word processing model. In order to avoid the problem of feature sparseness and dimension explosion caused by a large number of categories of features of the input word processing model, the words to be input, the part-of-speech information of the words to be input, and the dependency relationship of the first word are input into the embedding layer through the input layer. Then, the low-dimensional dense word feature vector, part-of-speech feature vector and the relationship feature vector are generated through the embedding layer, according to the words to be input, the part-of-speech information of the words to be input, and the dependency relationship of the first word, so as to avoid the problem of feature sparseness and dimension explosion. After that, the word feature vector, the part-of-speech feature vector and the relationship feature vector are spliced to obtain a first splicing feature vector. For example, when a queue is used for caching and the first three words in the queue are taken as the second word, the first splicing feature vector can be expressed as:

$$x^w = \{lc(s_2), Rc(s_2), s_1, s_2, P(s_1), P(s_2), R(s_1), R(s_2), b_1, b_2, b_3, P(b_1), P(b_2), P(b_3)\},$$

where $x^w$ is the first splicing feature vector, $s_i$ is the word feature vector of the i-th word of the set of words to be processed, $b_i$ is the word feature vector of the i-th word in the queue, $lc(s_2)$ is the word feature vector of the subordinate word of the determined $s_2$, $Rc(s_2)$ is the word feature vector of the dominant word of the determined $s_2$, i.e. $lc(s_2)$ and $Rc(s_2)$ are the word feature vectors of the first word, and P( ) is used to represent the word feature vector of a certain word, R( ) is used to represent the relationship feature vector of a certain word.

Second, the first splicing feature vector, the part-of-speech feature vector and the relationship feature vector are input into both the hidden layer and the self-attention mechanism layer through the embedding layer. And a first feature vector is determined with the preset activation function through the hidden layer, according to the first splicing feature vector, the part-of-speech feature vector and the relationship feature vector. Then, the first feature vector is input into the output layer. The word feature vector, the part-of-speech feature vector and the relationship feature vector can be automatically combined by using the preset activation function, which improves the feature fitting ability of the word processing model. The preset activation function includes: $h = \tan h((w_1^w x^w + w_1^t x^t + w_1^l x^l + b)^3)$, where h is the first feature vector, $w_1^w$ is a weight matrix corresponding to the first splicing feature vector, $w_1^t$ is a weight matrix corresponding to the part-of-speech feature vector, $w_1^l$ is a weight matrix corresponding to the relationship feature vector, $x^w$ is the first splicing feature vector, $x^t$ is the part-of-speech feature vector, $x^l$ is the relationship feature vector, b is a bias.

Then, a second feature vector is determined through the self-attention mechanism layer, according to the first splicing feature vector, the part-of-speech feature vector and the relationship feature vector, and the second feature vector is input into the output layer. The second feature vector may be determined according to the first splicing feature vector, the part-of-speech feature vector and the relationship feature vector in the following manner: splicing the first splicing feature vector, the part-of-speech feature vector and the relationship feature vector to obtain a second splicing feature vector, and then determining a target weight with a first formula according to the second splicing feature vector, and determining the second feature vector with a second formula according to the second splicing feature vector and the target weight. The first formula includes:

$$S = f\left(\frac{X \cdot X}{\sqrt{d_x}}\right),$$

and the second formula includes: $L = S \cdot X$, where X is the second splicing feature vector, S is the target weight, f is a softmax function, dx is a dimension of the second splicing feature vector, and L is the second feature vector.

Finally, the confidence levels, each corresponding to a respective one of the plurality of preset set update operations are output through the output layer, according to the first feature vector and the second feature vector. The confidence levels, each corresponding to a respective one of the plurality of preset set update operations may be output according to the first feature vector and the second feature vector in the following manner: splicing the first feature vector and the second feature vector through the output layer, obtaining a normalized distribution of the confidence levels, each corresponding to a respective one of the plurality of preset set update operations through the softmax function.

In block 1032, a preset set update operation with a highest one of the confidence levels is taken as the target set update operation.

For instance, after the output layer outputs the confidence levels, each corresponding to a respective one of the plurality of preset set update operations, the preset set update operation with the highest one of the confidence levels can be taken as the target set update operation. For example, if the confidence levels, each corresponding to a respective one of the plurality of preset set update operations output by the output layer are 0.7, 0.2, 0.1 respectively, the preset set update operation with the confidence level of 0.7 will be taken as the target set update operation.

In some embodiments, the dependency relationship determination step includes steps a) to step d):

In step a), the set of words to be processed is updated according to the target set update operation, to obtain an updated set of words; and a dependency relationship of the word to be processed in the set of words to be processed is determined according to the target set update operation.

For example, the target set update operation includes a shift operation, a first update operation, and a second update operation. After determining the target set update operation corresponding to the set of words to be processed, the word to be processed in the set of words to be processed may be updated according to the target set update operation, to obtain the updated set of words. And the dependency relationship of the word to be processed in the set of words to be processed is determined according to the target set update operation. For example, in response to that the target set update operation is the first update operation, it means there is a first dependency relationship between words to be processed (the first dependency relationship is a dependency relationship corresponding to the first update operation), a second-place word in two indicated words to be processed (the two indicated words to be processed refers to two words to be processed with the first dependency relationship determined by the word processing model) is shifted out of the set of words to be processed, and a dependency relationship between the two indicated words to be processed is set as the first dependency relationship. Meanwhile, the dependency relationship between the two indicated words to be processed is stored in the memory, and the first dependency relationship indicates that a second-place word in the two indicated words is a subordinate word of a front word. In response to that the target set update operation is the second update operation, it means there is a second dependency relationship between words to be processed (the second dependency relationship is a dependency relationship corresponding to the second update operation), a first-place word in two indicated words to be processed (the two indicated words to be processed refers to two words to be processed with the second dependency relationship determined by the word processing model) is shifted out of the set of words to be processed, and a dependency relationship between the two indicated words to be processed is set as the second dependency relationship. At the same time, the dependency relationship between the two indicated words to be processed is stored in the memory, and the second dependency relationship indicates that the first-place word in the two indicated words is a subordinate word of the second-place word. In response to that the target set update operation is the shift operation, it means there is no dependency relationship between words to be processed, a specified word of the plurality of words is taken as a new word to be processed in the set of words to be processed. For example, the first word in the cache can be taken as the new word to be processed in the set of words to be processed.

Further, the first dependency relationship and the second dependency relationship can be classified according to different types of dependency relationships. For example, the first dependence relationship can be classified into the first dependency relationship-subject-verb relationship, the first dependency relationship-verb-object relationship, etc. The second dependence relationship can be classified into the second dependency relationship-subject-verb relationship, the second dependency relationship-verb-object relationship, etc.

In step b), the words to be input, the part-of-speech information of the words to be input, and the dependency relationship of the first word is re-determined according to the updated set of words.

For instance, after the updated set of words is obtained, the words to be input, the part-of-speech information of the words to be input, and the dependency relationship of the first word are re-determined according to the word(s) to be processed contained in the updated set of words, the words stored in the current cache, and the dependency relationship stored in the memory. For example, when the set of words to be processed includes a word 1 (a pronoun) and a word 2 (a quantifier), and the words stored in the cache following the word to be processed are word 3 (a noun), word 4 (an auxiliary word), and word 5 (a noun), the first word and dependency relationship of the first word do not exist, and in case that the preset number is 3, the words to be input include the words to be processed (the word 1 and the word 2), the first word (null) and the second word (the word 3, the word 4 and the word 5), the part-of-speech information of the words to be input is: a pronoun, a quantifier, a noun, an auxiliary word and a noun, and the dependency relationship of the first word is null. If the target set update operation is shifting the word 1 out of the set of words to be processed, and there is a dependency relationship between the word 1 and word 2, the set of words to be processed will be updated according to the target set update operation to obtain the updated set of words containing the word 2. Here, the re-determined words to be input include the word to be processed (the word 2), the first word (the word 1) and the second word (the word 3, the word 4 and the word 5), the part-of-speech information of the words to be input is: a quantifier, a pronoun, a noun, an auxiliary word and a noun, and the dependency relationship of the first word includes the dependency relationship between the word 1 and the word 2.

In step c), a set update operation corresponding to the updated set of words is determined from the plurality of preset set update operations with the word processing model, according to the redetermined words to be input, the redetermined part-of-speech information of the words to be input, and the redetermined dependency relationship of the first word.

In this step, the redetermined words to be input, the redetermined part-of-speech information of the words to be input, and the redetermined dependency relationship of the first word is input into the word processing model, to obtain the confidence levels, each corresponding to a respective one of the plurality of preset set update operations, and the preset set update operation with a highest one of the confidence levels is taken as the target set update operation.

In step d), the updated set of words is taken as a new set of words to be processed, and the obtained set update operation corresponding to the updated set of words is taken as a new target set update operation.

For instance, after determining a target set update operation corresponding to the updated set of words, the updated set of words is taken as a new set of words to be processed, and the obtained set update operation corresponding to the updated set of words is taken as a new target set update operation. And then, the dependency relationship determining step is performed cyclically, until obtaining a dependency parsing result of the sentence to be processed.

For example, in the case that the set of words to be processed is a stack, a queue is used for buffering, the preset number is 3, and the sentence to be processed is "the brown fox cried and jumped into the grass" in the Chinese language, word recognition is first performed on the sentence to be processed, and the obtained plurality of words and the obtained part-of-speech information corresponding to each of the plurality of words are shown in FIG. 2B.

Then, the plurality of words are stored in the queue, according to the sequence of the plurality of words in the sentence to be processed, and the plurality of words in the queue are input successively into the stack in the word sequence, and the dependency determination step is performed, as described in Table 1.

TABLE 1

| Step | Stack | Queue | Target set update operation | Dependency relationship |
|---|---|---|---|---|
| 0 | ∅ | 0 1 2 3 4 5 6 7 8 9 10 | Shift | — |
| 1 | 0 | 1 2 3 4 5 6 7 8 9 10 | Shift | — |
| 2 | 0 1 | 2 3 4 5 6 7 8 9 10 | Arc_left | ATT |
| 3 | 1 | 2 3 4 5 6 7 8 9 10 | Shift | — |
| 4 | 1 2 | 3 4 5 6 7 8 9 10 | Arc_left | ATT |
| 5 | 2 | 3 4 5 6 7 8 9 10 | Shift | — |
| 6 | 2 3 | 4 5 6 7 8 9 10 | Arc_right | RAD |
| 7 | 2 | 4 5 6 7 8 9 10 | Shift | — |
| 8 | 2 4 | 5 6 7 8 9 10 | Arc_left | ATT |
| 9 | 4 | 5 6 7 8 9 10 | Shift | — |
| 10 | 4 5 | 6 7 8 9 10 | Shift | — |
| 11 | 4 5 6 | 7 8 9 10 | Arc_left | ADV |
| 12 | 4 6 | 7 8 9 10 | Arc_left | SBV |
| 13 | 6 | 7 8 9 10 | Shift | — |
| 14 | 6 7 | 8 9 10 | Shift | — |
| 15 | 6 7 8 | 9 10 | Arc_left | ADV |
| 16 | 6 8 | 9 10 | shift | — |
| 17 | 6 8 9 | 10 | Arc_right | RAD |
| 18 | 6 8 | 10 | Shift | — |
| 19 | 6 8 10 | ∅ | Arc_right | VOB |
| 20 | 6 8 | ∅ | Arc_right | VOB |
| 21 | 6 | ∅ | | ROOT |
| 22 | ∅ | ∅ | Completed | Completed |

As shown in Table 1, Arc_right represents the first update operation, Arc_left represents the second update operation, Shift represents the shift operation, ROOT represents the root node, RAD represents a first dependency relationship-right adjunct relationship, VOB represents a first dependency relationship-verb-object relationship, ATT represents a second dependency relationship-attribute relationship, ADV represents a second dependency relationship-adverbial relationship, SBV represents a second dependency relationship-subject-verb relationship. At the beginning, the stack is empty (that is, in the step 0), and all words are stored in the queue (0, 1, 2, . . . represent a plurality of words arranged in the word sequence). Since the stack is empty and there is no dependency relationship, the word processing model executes the shift operation and proceed to the step 1. At this time, there is still only one word 0 in the stack, and the word processing model executes the shift operation, and then proceed to the step 2. During the step 2, there are two words, the word 0 and the word 1, in the stack, and the word processing model judges that there is a dependency relationship between the words to be processed, which is the second dependency relationship-attribute relationship, and thus executes the second update operation and store this dependency relationship. The word 0 is shifted out of the stack and the word processing model proceeds to the step 3. The specific change process of the stack and queue status of steps 3-15 is shown in Table 1, which will not be elaborated here.

During the step 16, the words in the stack are the word 6 and the word 8. If the traditional transition-based dependency syntax analysis is adopted, the dependency relationship between the word 6 and the word 8 is determined to be the first dependency relationship-verb-object relationship, and thus the first update operation is performed, and the word 8 is shifted out of the stack. However, in fact, the word 10 is a subordinate word of the word 8, and if the word 8 is shifted out of the stack, the dependency relationship between the word 8 and the word 10 cannot be determined, resulting in a wrong dependency relationship. With the word processing model of the present disclosure, the shift operation can be performed at the step 16. Therefore, in the subsequent steps, the dependency relationship between the word 8 and the word 10 can be determined accurately, and the accuracy of the dependency parsing result can be improved. During the step 21, there is only one word 6 in the stacke, the queue is empty, and the word processing model judges that the dependency relationship of the word 6 is the root node, stores the dependency relationship, and meanwhile, shifts the word 6 out of the stack to complete the dependency analysis of the sentence to be processed.

In some embodiments, the word processing model may be trained in the following manner. first training data are built, where the training data may include: a set of input samples and a set of output samples. For example, CTB8.0 (Chinese Binzhou data set), Internet news data set and Artificial Intelligence (AI) voice assistant data set may be used as original data. Then, the original data are annotated by manual revision, to get training data. Here, the set of input samples are sentences to be processed that have been segmented and annotated with part-of-speech information and a word sequence, and the set of output samples are annotated target set update operations. The training data are taken as the model training samples to obtain the trained word processing model.

Figure 5:
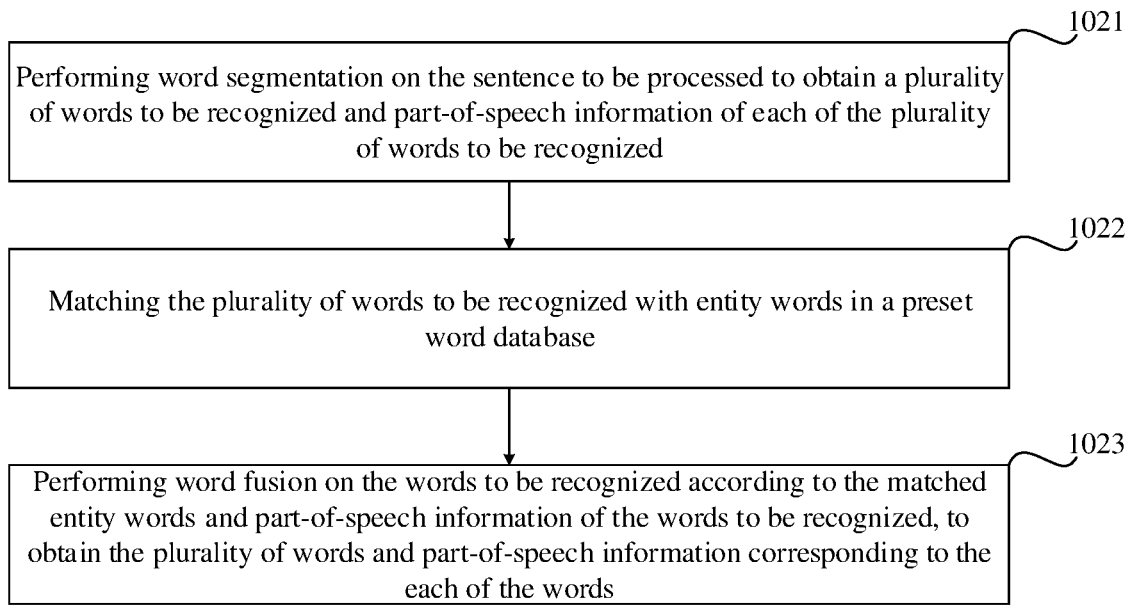
FIG. 5 is a flowchart showing a block 102 of some embodiments of the present disclosure shown in FIG. 1.

FIG. 5 is a flowchart showing a block 102 of some embodiments of the present disclosure shown in FIG. 1. The block 102 includes blocks 1021-1023.

In block 1021, word segmentation is performed on the sentence to be processed to obtain a plurality of words to be recognized and part-of-speech information of each of the plurality of words to be recognized.

In block 1022, the plurality of words to be recognized are matched with entity words in a preset word database.

In block 1023, word fusion is performed on the word to be recognized according to the matched entity words and part-of-speech information of the words to be recognized, to obtain the plurality of words and part-of-speech information corresponding to the each of the words.

In a scenario, when performing word recognition processing on the sentence to be processed, word segmentation processing is required for the sentence to be processed to obtain a plurality of words and the part-of-speech information corresponding to each word. However, in the process of word segmentation, some entities may be excessively segmented as to lose their original information, thereby affecting the accuracy of the dependency parsing result, and thus making it impossible to accurately perform the semantic recognition. For example, when the sentence to be processed is "I want to play Plants vs. Zombies", the entity "Plants vs. Zombies" is segmented into three words: "plants", "versus" and "zombies" through word segmentation marks. In order to improve the accuracy of the semantic recognition, the sentence to be processed can be segmented first to obtain a plurality of words to be recognized and part-of-speech information of each word to be recognized. And the plurality of words to be recognized are matched with entity words in the preset word database, so as to recognize the entity of the sentence to be processed. If the corresponding entity words are matched, word fusion processing is performed on the words to be recognized according to the matched entity words and the part-of-speech information of the words to be recognized, to obtain a plurality of words and part-of-speech information corresponding to each of the plurality of words. Herein, the method of word fusion processing for the words to be recognized according to the matched entity words and the part-of-speech information of the words to be recognized can be: first, according to the starting position and ending position of a matched entity word in the sentence to be processed, the word fusion processing can be performed on the word to be recognized between the starting position and the ending position; then, the word segmentation marks inside the entity word are removed, and it is checked whether the beginning and end of the entity words have been separated by word segmentation marks, if not, the word segmentation marks are inserted to separate the entity word. Finally, the part-of-speech information corresponding to the entity word can be mapped to a noun.

In summary, in the present disclosure, one or more words to be input, the part-of-speech information of the words to be input, and the dependency relationship of the first word are input into the word processing model to obtain the target set update operation, and the dependency parsing result is determined according to the target set update operation. Compared with other technologies, the word processing model combines the features corresponding to the words to be input, the part-of-speech information of the words to be input, and the dependency relationship of the first word, without the need of manually constructing the feature templates. Meanwhile, the dependency relationship between a word subsequent to the word to be processed and the word to be processed is considered. Accordingly, the target set update operation can be selected accurately; the accuracy of the dependency parsing result can be improved, thereby improving the accuracy of the semantic recognition.

Figure 6:
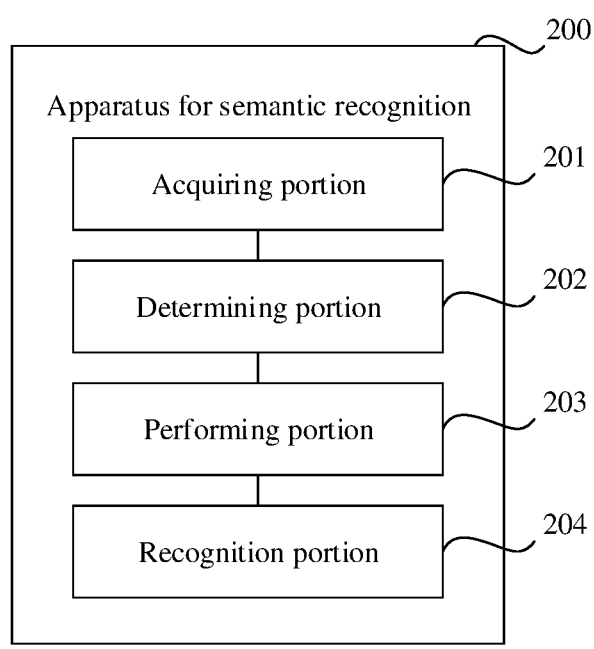
FIG. 6 is a block diagram illustrating an apparatus for semantic recognition, according to some embodiments of the present disclosure.

FIG. 6 is a block diagram illustrating an apparatus for semantic recognition, according to some embodiments of the present disclosure. As shown in FIG. 6, the apparatus 200 includes an acquiring portion 201, a determining portion 202, a performing portion 203 and a recognition portion 204.

The acquiring portion 201 is configured to, in response to that semantic analysis is being performed on information acquired by a terminal, acquire a sentence to be processed.

The acquiring portion 201 is further configured to perform word recognition on the sentence to be processed, to obtain a plurality of words and part-of-speech information corresponding to each of the plurality of words.

The determining portion 202 is configured to determine, with a pre-trained word processing model, a target set update operation corresponding to a set of words to be processed from a plurality of preset set update operations, according to one or more words to be input, part-of-speech information of the words to be input, and a dependency relationship of a first word.

Herein, the set of words to be processed is a set of words to be processed currently in the plurality of words; the words to be input include a word to be processed in the set of words to be processed, the first word and a second word; the first word is a word that has been determined to have a dependency relationship with the word to be processed in the plurality of words; the second word includes a preset number of words following the word to be processed in the plurality of words.

Herein, the word processing model is configured to obtain a word feature vector of the words to be input, a part-of-speech feature vector of the part-of-speech information and a relationship feature vector of the dependency relationship of the first word; calculate, with a preset activation function, a first feature vector according to the word feature vector, the part-of-speech feature vector and the relationship feature vector; calculate a second feature vector according to the word feature vector, the part-of-speech feature vector and the relationship feature vector; and calculate confidence levels of the plurality of preset set update operations according to the first feature vector and the second feature vector.

The performing portion 203 is configured to perform a dependency relationship determination step cyclically according to the target set update operation, until obtaining a dependency parsing result of the sentence to be processed, wherein the dependency parsing result represents a dependency relationship among the plurality of words.

The recognition portion 204 is configured to perform the semantic recognition on the sentence to be processed according to the dependency parsing result.

Figure 7:
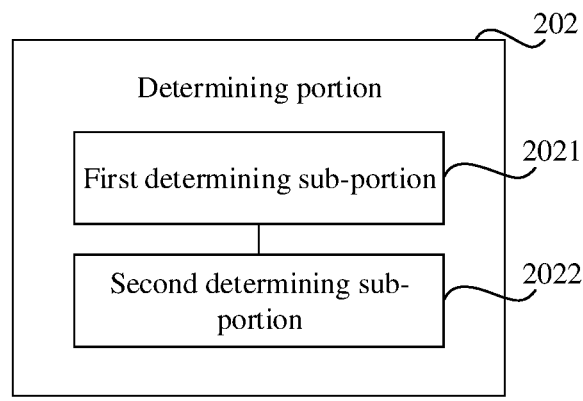
FIG. 7 is a block diagram illustrating a determining portion of some embodiments of the present disclosure shown in FIG. 6.

FIG. 7 is a block diagram illustrating a determining portion of some embodiments of the present disclosure shown in FIG. 6. As shown in FIG. 7, the determining portion 202 includes a first determining sub-portion 2021 and a second determining sub-portion 2022.

The first determining sub-portion 2021 is configured to input the words to be input, the part-of-speech information of the words to be input, and the dependency relationship of the first word into the word processing model, to obtain the confidence levels, each corresponding to a respective one of the plurality of preset set update operations.

The second determining sub-portion 2022 is configured to take a preset set update operation with a highest one of the confidence levels as the target set update operation.

In some embodiments, the word processing model includes an input layer, an embedding layer, a hidden layer, a self-attention mechanism layer and an output layer, and the first determining sub-portion 2021 is further configured to perform the following operations.

The first determining sub-portion 2021 is configured to input, through the input layer, the words to be input, the part-of-speech information of the words to be input, and the dependency relationship of the first wordt into the embedding layer.

The first determining sub-portion 2021 is further configured to generate, through the embedding layer, the word feature vector, the part-of-speech feature vector and the relationship feature vector according to the words to be input, the part-of-speech information of the words to be input, and splice the dependency relationship of the first word, and the word feature vector, the part-of-speech feature vector and the relationship feature vector to obtain a first splicing feature vector.

The first determining sub-portion 2021 is further configured to input, through the embedding layer, the first splicing feature vector, the part-of-speech feature vector and the relationship feature vector into both the hidden layer and the self-attention mechanism layer.

The first determining sub-portion 2021 is further configured to determine, through the hidden layer, a first feature vector with the preset activation function according to the first splicing feature vector, the part-of-speech feature vector and the relationship feature vector, and input the first feature vector into the output layer.

The first determining sub-portion 2021 is further configured to determine, through the self-attention mechanism layer, a second feature vector according to the first splicing feature vector, the part-of-speech feature vector and the relationship feature vector, and input the second feature vector into the output layer.

The first determining sub-portion 2021 is further configured to output, through the output layer, the confidence levels, each corresponding to a respective one of the plurality of preset set update operations, according to the first feature vector and the second feature vector.

In some embodiments, the performing portion 203 is configured to perform the dependency determination step in the following manner.

The set of words to be processed is updated according to the target set update operation, to obtain an updated set of words; and determining a dependency relationship of the word to be processed from the set of words to be processed according to the target set update operation.

The words to be input, the part-of-speech information of the words to be input, and the dependency relationship of the first word are re-determined according to the updated set of words.

With the word processing model, a set update operation corresponding to the updated set of words from the plurality of preset set update operations is determined according to the redetermined words to be input, the redetermined part-of-speech information of the words to be input, and the redetermined dependency relationship of the first word.

The updated set of words is taken as a new set of words to be processed, and the obtained set update operation corresponding to the updated set of words is taken as a new target set update operation.

In some embodiments, the target set update operation includes a shift operation, a first update operation, and a second update operation, and the performing portion 203 is configured to perform the following operations.

The performing portion 203 is configured to shift, in response to that the target set update operation is the first update operation, a second-place word in two indicated words to be processed out of the set of words to be processed, and set a dependency relationship between the two indicated words to be processed as a first dependency relationship, where the first dependency relationship indicates that the second-place word in the two indicated words is a subordinate word of a front word.

The performing portion 203 is further configured to shift, in response to that the target set update operation is the second update operation, the first-place word in the two indicated words to be processed out of the set of words to be processed, and set the dependency relationship between the two indicated words to be processed as a second dependency relationship, where the second dependency relationship indicates that the front word is the subordinate word of the second-place word in the two indicated words.

The performing portion 203 is further configured to take, in response to that the target set update operation is the shift operation, a specified word of the plurality of words as a new word to be processed in the set of words to be processed.

In some embodiments, the preset activation function includes:

$$h = \tan h((w_1^w x^w + w_1^t x^t + w_1^l x^1 + b)^3)$$

where h is the first feature vector, $w_1^w$ is a weight matrix corresponding to the first splicing feature vector, $w_1^t$ is a weight matrix corresponding to the part-of-speech feature vector, $w_1^l$ is a weight matrix corresponding to the relationship feature vector, $x^w$ is the first splicing feature vector, $x^t$ is the part-of-speech feature vector, $x^1$ is the relationship feature vector, b is a bias.

In some embodiments, the first determining sub-portion 2021 is configured to perform the following operations.

The first determining sub-portion 2021 is configured to splice the first splicing feature vector, the part-of-speech feature vector and the relationship feature vector to obtain a second splicing feature vector.

The first determining sub-portion 2021 is further configured to determine a target weight with a first formula according to the second splicing feature vector, where the first formula includes:

$$S = f\left(\frac{X \cdot X}{\sqrt{d_x}}\right)$$

where X is the second splicing feature vector, S is the target weight, f is a softmax function, dx is a dimension of the second splicing feature vector; and The first determining sub-portion 2021 is further configured to determine the second feature vector with a second formula according to the second splicing feature vector and the target weight, where the second formula includes:

$$L = S \cdot X$$

where L is the second feature vector.

Figure 8:
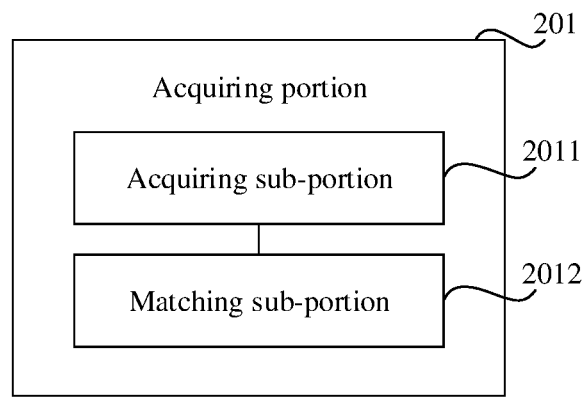
FIG. 8 is a block diagram illustrating an acquiring portion of some embodiments of the present disclosure shown in FIG. 6.

FIG. 8 is a block diagram illustrating an acquiring portion of some embodiments of the present disclosure shown in FIG. 6. As shown in FIG. 8, the acquiring portion includes an acquiring sub-portion 2011 and a matching sub-portion 2012.

The acquiring sub-portion 2011 is configured to perform word segmentation on the sentence to be processed to obtain a plurality of words to be recognized and part-of-speech information of each of the plurality of words to be recognized.

The matching sub-portion 2012 is configured to match the plurality of words to be recognized with entity words in a preset word database.

The acquiring sub-portion 2011 is further configured to perform word fusion on the words to be recognized according to the matched entity words and part-of-speech information of the words to be recognized, to obtain the plurality of words and part-of-speech information corresponding to the each of the words.

Regarding the apparatus in the above embodiments, the specific manner in which each portion performs the operations has been described in detail in the embodiment of the method, and detailed description will not be given here.

In summary, in the present disclosure, one or more words to be input, the part-of-speech information of the words to be input, and the dependency relationship of the first word are input into the word processing model to obtain the target set update operation, and the dependency parsing result is determined according to the target set update operation. Compared with other technologies, the word processing model combines the features corresponding to the words to be input, the part-of-speech information of the words to be input, and the dependency relationship of the first word, without the need of manually constructing the feature templates. Meanwhile, the dependency relationship between a word subsequent to the word to be processed and the word to be processed is considered. Accordingly, the target set update operation can be selected accurately; the accuracy of the dependency parsing result can be improved, thereby improving the accuracy of the semantic recognition.

Some embodiments of the present disclosure also provides a computer storage medium having stored thereon computer executable instructions, when the instructions are executed by a processor, operations of any one the aforementioned method for semantic recognition.

In summary, in the present disclosure, one or more words to be input, the part-of-speech information of the words to be input, and the dependency relationship of the first word are input into the word processing model to obtain the target set update operation, and the dependency parsing result is determined according to the target set update operation. Compared with other technologies, the word processing model combines the features corresponding to the words to be input, the part-of-speech information of the words to be input, and the dependency relationship of the first word, without the need of manually constructing the feature templates. Meanwhile, the dependency relationship between a word subsequent to the word to be processed and the word to be processed is considered. Accordingly, the target set update operation can be selected accurately; the accuracy of the dependency parsing result can be improved, thereby improving the accuracy of the semantic recognition.

Figure 9:
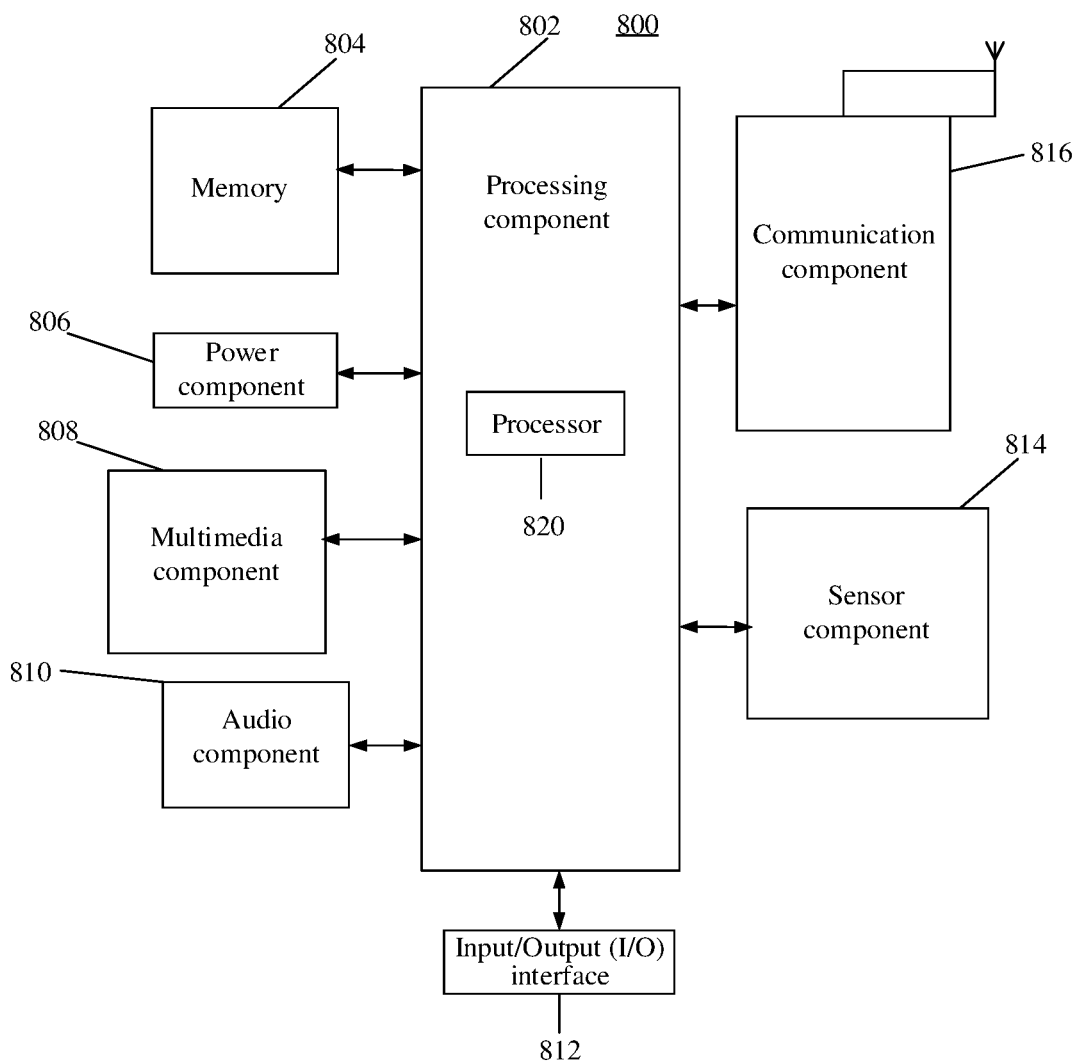
FIG. 9 is a block diagram illustrating an electronic device, according to some embodiments of the present disclosure.

FIG. 9 is a block diagram illustrating an electronic device 800, according to some embodiments of the present disclosure. For example, the electronic device 800 may be a mobile phone, a computer, a digital broadcast terminal, a messaging device, a gaming console, a tablet, a medical device, exercise equipment, a personal digital assistant, and the like.

Referring to FIG. 9, the electronic device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, a non-transitory computer-readable storage medium, or a combination thereof, such as an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). In some embodiments, organic light-emitting diode (OLED) or other types of displays can be employed. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other apparatuses. The apparatus 800 can access a wireless network based on a communication standard, such as Wi-Fi, 2G, 3G, 4G, or 5G, or a combination thereof. In some embodiments of the present disclosure, the communication component 816 receives a broadcast signal or broadcast associated information from an external broadcast management system via a broadcast channel. In some embodiments of the present disclosure, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments of the present disclosure, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for semantic recognition.

In some embodiments of the present disclosure, there is also provided a non-transitory computer-readable storage medium including instructions, such as included in the memory 804, executable by the processor 820 in the apparatus 800, for performing the above-described methods. For example, the non-transitory computer-readable storage medium may be a ROM, a CD-ROM, a magnetic tape, a floppy disc, an optical data storage device, and the like.

In some embodiments of the present disclosure, a computer program product is further provided, which contains a computer program that can be executed by a programmable device. The computer program has a code portion for performing the above-mentioned method for semantic recognition when executed by the programmable device.

Various embodiments of the present disclosure can have one or more of the following advantages.

First, in response to performing semantic analysis on information acquired by a terminal, a sentence to be processed is acquired, and word recognition on the sentence to be processed is performed to obtain a plurality of words and part-of-speech information corresponding to each of the plurality of words. Then, with a pre-trained word processing model, a target set update operation corresponding to a set of words to be processed is determined from a plurality of preset set update operations, according to one or more words to be input, part-of-speech information of the words to be input, and a dependency relationship of a first word. Herein, the word processing model is configured to calculate a first feature vector and a second feature vector according to the obtained word feature vector, the obtained part-of-speech feature vector and the obtained relationship feature vector, and calculate confidence levels of the plurality of preset set update operations according to the first feature vector and the second feature vector. Then, a dependency relationship determination step is cyclically performed according to the target set update operation, until obtaining a dependency parsing result of the sentence to be processed. And finally, the semantic recognition on the sentence to be processed is performed according to the dependency parsing result. Therefore, in the present disclosure, one or more words to be input, the part-of-speech information of the words to be input, and the dependency relationship of the first word are input into the word processing model to obtain the target set update operation, and the dependency parsing result is determined according to the target set update operation. Compared with other technologies, the word processing model combines the features corresponding to the words to be input, the part-of-speech information of the words to be input, and the dependency relationship of the first word, without the need of manually constructing the feature templates. Meanwhile, the dependency relationship between a word second-place to the word to be processed and the word to be processed is considered. Accordingly, the target set update operation can be selected accurately; the accuracy of the dependency parsing result can be improved, thereby improving the accuracy of the semantic recognition.

The various device components, portions, units, blocks, or portions may have modular configurations, or are composed of discrete components, but nonetheless can be referred to as "portions" in general. In other words, the "components," "portions," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

In some embodiments, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for semantic recognition, comprising:
   in response to performing semantic analysis on information acquired by a terminal, acquiring a sentence to be processed;
   performing word recognition on the sentence to be processed, to obtain a plurality of words and part-of-speech information corresponding to each of the plurality of words;
   determining, with a pre-trained word processing model, a target set update operation corresponding to a set of words to be processed from a plurality of preset set update operations, according to one or more words to be input, part-of-speech information of the words to be input, and a dependency relationship of a first word;
   wherein the set of words to be processed is a set of words to be processed currently in the plurality of words; the words to be input include a word to be processed in the set of words to be processed, the first word and a second word; the first word is a word that follows the word to be processed and has been determined to have a dependency relationship with the word to be processed in the plurality of words; the second word includes a preset number of words following the first word; and the word to be processed is a verb, and the second word is a subordinate word of the first word;
   wherein the word processing model is configured to: obtain a word feature vector of the words to be input, a part-of-speech feature vector of the part-of-speech information and a relationship feature vector of the dependency relationship of the first word; calculate, with a preset activation function, a first feature vector according to the word feature vector, the part-of-speech feature vector and the relationship feature vector; calculate a second feature vector according to the word feature vector, the part-of-speech feature vector and the relationship feature vector; and calculate confidence levels of the plurality of preset set update operations according to the first feature vector and the second feature vector;
   performing a dependency relationship determination step cyclically according to the target set update operation, until obtaining a dependency parsing result of the sentence to be processed, wherein the dependency parsing result represents a dependency relationship among the plurality of words; and performing the semantic recognition on the sentence to be processed according to the dependency parsing result;

wherein the target set update operation comprises a shift operation, a first update operation, and a second update operation;

wherein updating the set of words to be processed according to the target set update operation, to obtain the updated set of words; and determining the dependency relationship of the word to be processed from the set of words to be processed according to the target set update operation, comprises:

in response to that the target set update operation is the first update operation, shifting a second-place word in two indicated words to be processed out of the set of words to be processed, and setting a dependency relationship between the two indicated words to be processed as a first dependency relationship, wherein the first dependency relationship indicates that the second-place word is a subordinate word of a first-place word in the two indicated words;

in response to that the target set update operation is the second update operation, shifting the first-place word in the two indicated words to be processed out of the set of words to be processed, and setting the dependency relationship between the two indicated words to be processed as a second dependency relationship, wherein the second dependency relationship indicates that the first-place word is the subordinate word of the second-place word in the two indicated words; and in response to that the target set update operation is the shift operation, taking a specified word of the plurality of words as a new word to be processed in the set of words to be processed.

2. The method of claim 1, wherein determining, with a pre-trained word processing model, the target set update operation corresponding to the set of words to be processed from the plurality of preset set update operations, according to the words to be input, the part-of-speech information of the words to be input, and the dependency relationship of the first word, comprises:

inputting the words to be input, the part-of-speech information of the words to be input, and the dependency relationship of the first word into the word processing model, to obtain the confidence levels, each corresponding to a respective one of the plurality of preset set update operations;

taking a preset set update operation with a highest one of the confidence levels as the target set update operation.

3. The method of claim 2, wherein the word processing model comprises an input layer, an embedding layer, a hidden layer, a self-attention mechanism layer and an output layer;

wherein inputting the words to be input, the part-of-speech information of the words to be input, and the dependency relationship of the first word into the word processing model, to obtain the confidence levels, each corresponding to a respective one of the plurality of preset set update operations, comprises:

inputting, through the input layer, the words to be input, the part-of-speech information of the words to be input, and the dependency relationship of the first word into the embedding layer;

generating, through the embedding layer, the word feature vector, the part-of-speech feature vector and the relationship feature vector according to the words to be input, the part-of-speech information of the words to be input, and the dependency relationship of the first word, and splicing the word feature vector, the part-of-speech feature vector and the relationship feature vector to obtain a first splicing feature vector;

inputting, through the embedding layer, the first splicing feature vector, the part-of-speech feature vector and the relationship feature vector into both the hidden layer and the self-attention mechanism layer;

determining, through the hidden layer, a first feature vector with the preset activation function according to the first splicing feature vector, the part-of-speech feature vector and the relationship feature vector, and inputting the first feature vector into the output layer;

determining, through the self-attention mechanism layer, a second feature vector according to the first splicing feature vector, the part-of-speech feature vector and the relationship feature vector, and inputting the second feature vector into the output layer; and outputting, through the output layer, the confidence levels, each corresponding to a respective one of the plurality of preset set update operations, according to the first feature vector and the second feature vector.

4. The method of claim 3, wherein determining the second feature vector according to the first splicing feature vector, the part-of-speech feature vector and the relationship feature vector, comprises:

splicing the first splicing feature vector, the part-of-speech feature vector and the relationship feature vector to obtain a second splicing feature vector;

determining a target weight with a first formula according to the second splicing feature vector, wherein the first formula comprises:

$$S = f\left(\frac{X \cdot X}{\sqrt{d_x}}\right)$$

where X is the second splicing feature vector, S is the target weight, f is a softmax function, dx is a dimension of the second splicing feature vector; and determining the second feature vector with a second formula according to the second splicing feature vector and the target weight, wherein the second formula comprises:

$$L = S \cdot X$$

where L is the second feature vector.

5. The method of claim 1, wherein the dependency relationship determination step comprises:

updating the set of words to be processed according to the target set update operation, to obtain an updated set of words; and determining a dependency relationship of the word to be processed in the set of words to be processed according to the target set update operation;

re-determining the words to be input, the part-of-speech information of the words to be input, and the dependency relationship of the first word according to the updated set of words;

determining, with the word processing model, a set update operation corresponding to the updated set of words from the plurality of preset set update operations, according to the redetermined words to be input, the redetermined part-of-speech information of the words to be input, and the redetermined dependency relationship of the first word;

taking the updated set of words as a new set of words to be processed, and taking the obtained set update operation corresponding to the updated set of words as a new target set update operation.

6. The method of claim 1, wherein the preset activation function comprises:

$$h=\tan h((w_1^w x^w + w_1^t x^t + w_1^l x^l + b)^3)$$

where h is the first feature vector, $w_1^w$ is a weight matrix corresponding to the first splicing feature vector, $w_1^t$ is a weight matrix corresponding to the part-of-speech feature vector, $w_1^l$ is a weight matrix corresponding to the relationship feature vector, $x^w$ is the first splicing feature vector, $x^t$ is the part-of-speech feature vector, $x^l$ is the relationship feature vector, b is a bias.

7. The method of claim 1, wherein performing the word recognition on the sentence to be processed to obtain the plurality of words and the part-of-speech information corresponding to each of the plurality of words, comprises:

performing word segmentation on the sentence to be processed to obtain a plurality of words to be recognized and part-of-speech information of each of the plurality of words to be recognized;

matching the plurality of words to be recognized with entity words in a preset word database;

performing word fusion on the words to be recognized according to the matched entity words and part-of-speech information of the words to be recognized, to obtain the plurality of words and part-of-speech information corresponding to the each of the words.

8. An electronic device, comprising:

a processor;

memory storing a computer program executable by the processor;

wherein the processor is configured to:

in response to that semantic analysis is being performed on information acquired by a terminal, acquire a sentence to be processed;

perform word recognition on the sentence to be processed, to obtain a plurality of words and part-of-speech information corresponding to each of the plurality of words;

determine, with a pre-trained word processing model, a target set update operation corresponding to a set of words to be processed from a plurality of preset set update operations, according to one or more words to be input, part-of-speech information of the words to be input, and a dependency relationship of a first word;

wherein the set of words to be processed is a set of words to be processed currently in the plurality of words; the words to be input include a word to be processed in the set of words to be processed, the first word and a second word; the first word is a word that follows the word to be processed and has been determined to have a dependency relationship with the word to be processed in the plurality of words; the second word includes a preset number of words following the first word; and the word to be processed is a verb, and the second word is a subordinate word of the first word;

wherein the word processing model is configured to: obtain a word feature vector of the words to be input, a part-of-speech feature vector of the part-of-speech information and a relationship feature vector of the dependency relationship of the first word, calculate, with a preset activation function, a first feature vector according to the word feature vector, the part-of-speech feature vector and the relationship feature vector; calculate a second feature vector according to the word feature vector, the part-of-speech feature vector and the relationship feature vector; and calculate confidence levels of the plurality of preset set update operations according to the first feature vector and the second feature vector;

perform a dependency relationship determination step cyclically according to the target set update operation, until obtaining a dependency parsing result of the sentence to be processed, wherein the dependency parsing result represents a dependency relationship among the plurality of words; and perform the semantic recognition on the sentence to be processed according to the dependency parsing result;

wherein the target set update operation comprises a shift operation, a first update operation, and a second update operation;

wherein in updating the set of words to be processed according to the target set update operation, to obtain the updated set of words; and determining the dependency relationship of the word to be processed from the set of words to be processed according to the target set update operation, the processor is configured to:

in response to that the target set update operation is the first update operation, shift a second-place word in two indicated words to be processed out of the set of words to be processed, and set a dependency relationship between the two indicated words to be processed as a first dependency relationship, wherein the first dependency relationship indicates that the second-place word is a subordinate word of a first-place word in the two indicated words;

in response to that the target set update operation is the second update operation, shift the first-place word in the two indicated words to be processed out of the set of words to be processed, and set the dependency relationship between the two indicated words to be processed as a second dependency relationship, wherein the second dependency relationship indicates that the first-place word is the subordinate word of the second-place word in the two indicated words; and in response to that the target set update operation is the shift operation, take a specified word of the plurality of words as a new word to be processed in the set of words to be processed.

9. The electronic device of claim 8, wherein in determining, with a pre-trained word processing model, the target set update operation corresponding to the set of words to be processed from the plurality of preset set update operations, according to the words to be input, the part-of-speech information of the words to be input, and the dependency relationship of the first word, the processor is configured to:

input the words to be input, the part-of-speech information of the words to be input, and the dependency relationship of the first word into the word processing model, to obtain the confidence levels, each corresponding to a respective one of the plurality of preset set update operations;

take a preset set update operation with a highest one of the confidence levels as the target set update operation.

10. The electronic device of claim 9, wherein the word processing model comprises an input layer, an embedding layer, a hidden layer, a self-attention mechanism layer and an output layer; wherein in inputting the words to be input, the part-of-speech information of the words to be input, and the dependency relationship of the first word into the word processing model, to obtain the confidence levels, each corresponding to a respective one of the plurality of preset set update operations, the processor is further configured to:
- input, through the input layer, the words to be input, the part-of-speech information of the words to be input, and the dependency relationship of the first word into the embedding layer;
- generate, through the embedding layer, the word feature vector, the part-of-speech feature vector and the relationship feature vector according to the words to be input, the part-of-speech information of the words to be input, and the dependency relationship of the first word, and splice the word feature vector, the part-of-speech feature vector and the relationship feature vector to obtain a first splicing feature vector;
- input, through the embedding layer, the first splicing feature vector, the part-of-speech feature vector and the relationship feature vector into both the hidden layer and the self-attention mechanism layer;
- determine, through the hidden layer, a first feature vector with the preset activation function according to the first splicing feature vector, the part-of-speech feature vector and the relationship feature vector, and input the first feature vector into the output layer;
- determine, through the self-attention mechanism layer, a second feature vector according to the first splicing feature vector, the part-of-speech feature vector and the relationship feature vector, and input the second feature vector into the output layer; and
- output, through the output layer, the confidence levels, each corresponding to a respective one of the plurality of preset set update operations, according to the first feature vector and the second feature vector.

11. The electronic device of claim 10, wherein in determining the second feature vector according to the first splicing feature vector, the part-of-speech feature vector and the relationship feature vector, the processor is configured to:
- splice the first splicing feature vector, the part-of-speech feature vector and the relationship feature vector to obtain a second splicing feature vector;
- determine a target weight with a first formula according to the second splicing feature vector, wherein the first formula comprises:

$$S = f\left(\frac{X \cdot X}{\sqrt{d_x}}\right)$$

where X is the second splicing feature vector, S is the target weight, f is a softmax function, dx is a dimension of the second splicing feature vector; and
- determine the second feature vector with a second formula according to the second splicing feature vector and the target weight, wherein the second formula comprises:

$$L = S \cdot X$$

where L is the second feature vector.

12. The electronic device of claim 11, wherein in performing the word recognition on the sentence to be processed to obtain the plurality of words and the part-of-speech information corresponding to each of the plurality of words, the processor is configured to:
- perform word segmentation on the sentence to be processed to obtain a plurality of words to be recognized and part-of-speech information of each of the plurality of words to be recognized;
- match the plurality of words to be recognized with entity words in a preset word database; and
- perform word fusion on the words to be recognized according to the matched entity words and part-of-speech information of the words to be recognized, to obtain the plurality of words and part-of-speech information corresponding to the each of the words.

13. The electronic device of claim 12, further comprising a display screen configured to display a result of the semantic recognition, wherein
- the processor is configured to input one or more words to be input, the part-of-speech information of the words to be input, and the dependency relationship of the first word into the word processing model to obtain the target set update operation, and determine the dependency parsing result according to the target set update operation;
- the word processing model combines the features corresponding to the words to be input, the part-of-speech information of the words to be input, and the dependency relationship of the first word, without a need of manually constructing the feature templates;
- the dependency relationship between a word second-place to the word to be processed and the word to be processed is taken into account in the word processing model, to thereby select the target set update operation accurately and improve accuracy of the dependency parsing result and accuracy of the semantic recognition.

14. The electronic device of claim 8, wherein the dependency relationship determination step comprises:
- updating the set of words to be processed according to the target set update operation, to obtain an updated set of words, and determining a dependency relationship of the word to be processed in the set of words to be processed according to the target set update operation;
- re-determining the words to be input, the part-of-speech information of the words to be input, and the dependency relationship of the first word according to the updated set of words;
- determining, with the word processing model, a set update operation corresponding to the updated set of words from the plurality of preset set update operations, according to the redetermined words to be input, the redetermined part-of-speech information of the words to be input, and the redetermined dependency relationship of the first word; and
- taking the updated set of words as a new set of words to be processed, and taking the obtained set update operation corresponding to the updated set of words as a new target set update operation.

15. The electronic device of claim 8, wherein the preset activation function comprises:

$$h = \tan h((w_1^w x^w + w_1^t x^t + w_1^l x^l + b)^3)$$

where h is the first feature vector, $w_1^w$ is a weight matrix corresponding to the first splicing feature vector, $w_1^t$ is a weight matrix corresponding to the part-of-speech feature vector, $w_1^l$ is a weight matrix corresponding to the relationship feature vector, $x^w$ is the first splicing feature vector, $x^t$ is the part-of-speech feature vector, $x^l$ is the relationship feature vector, b is a bias.

16. A non-transitory computer storage medium having stored thereon computer-executable instructions that, when executed by a processor, cause operations of a method to be performed, the method comprising:

in response to performing semantic analysis on information acquired by a terminal, acquiring a sentence to be processed;

performing word recognition on the sentence to be processed, to obtain a plurality of words and part-of-speech information corresponding to each of the plurality of words;

determining, with a pre-trained word processing model, a target set update operation corresponding to a set of words to be processed from a plurality of preset set update operations, according to one or more words to be input, part-of-speech information of the words to be input, and a dependency relationship of a first word;

wherein the set of words to be processed is a set of words to be processed currently in the plurality of words; the words to be input include a word to be processed in the set of words to be processed, the first word and a second word; the first word is a word that follows the word to be processed and has been determined to have a dependency relationship with the word to be processed in the plurality of words; the second word includes a preset number of words following the first word; and the word to be processed is a verb, and the second word is a subordinate word of the first word;

wherein the word processing model is configured to: obtain a word feature vector of the words to be input, a part-of-speech feature vector of the part-of-speech information and a relationship feature vector of the dependency relationship of the first word; calculate, with a preset activation function, a first feature vector according to the word feature vector, the part-of-speech feature vector and the relationship feature vector; calculate a second feature vector according to the word feature vector, the part-of-speech feature vector and the relationship feature vector; and calculate confidence levels of the plurality of preset set update operations according to the first feature vector and the second feature vector;

performing a dependency relationship determination step cyclically according to the target set update operation, until obtaining a dependency parsing result of the sentence to be processed, wherein the dependency parsing result represents a dependency relationship among the plurality of words;

performing the semantic recognition on the sentence to be processed according to the dependency parsing result;

wherein the target set update operation comprises a shift operation, a first update operation, and a second update operation;

wherein updating the set of words to be processed according to the target set update operation, to obtain the updated set of words; and determining the dependency relationship of the word to be processed from the set of words to be processed according to the target set update operation, comprises:

in response to that the target set update operation is the first update operation, shifting a second-place word in two indicated words to be processed out of the set of words to be processed, and setting a dependency relationship between the two indicated words to be processed as a first dependency relationship, wherein the first dependency relationship indicates that the second-place word is a subordinate word of a first-place word in the two indicated words;

in response to that the target set update operation is the second update operation, shifting the first-place word in the two indicated words to be processed out of the set of words to be processed, and setting the dependency relationship between the two indicated words to be processed as a second dependency relationship, wherein the second dependency relationship indicates that the first-place word is the subordinate word of the second-place word in the two indicated words; and in response to that the target set update operation is the shift operation, taking a specified word of the plurality of words as a new word to be processed in the set of words to be processed.

17. The non-transitory computer storage medium of claim 16, wherein determining, with a pre-trained word processing model, the target set update operation corresponding to the set of words to be processed from the plurality of preset set update operations, according to the words to be input, the part-of-speech information of the words to be input, and the dependency relationship of the first word, comprises:

inputting the words to be input, the part-of-speech information of the words to be input, and the dependency relationship of the first word into the word processing model, to obtain the confidence levels, each corresponding to a respective one of the plurality of preset set update operations;

taking a preset set update operation with a highest one of the confidence levels as the target set update operation.

18. The non-transitory computer storage medium of claim 17, wherein the word processing model comprises an input layer, an embedding layer, a hidden layer, a self-attention mechanism layer and an output layer;

wherein inputting the words to be input, the part-of-speech information of the words to be input, and the dependency relationship of the first word into the word processing model, to obtain the confidence levels, each corresponding to a respective one of the plurality of preset set update operations, comprises:

inputting, through the input layer, the words to be input, the part-of-speech information of the words to be input, and the dependency relationship of the first word into the embedding layer;

generating, through the embedding layer, the word feature vector, the part-of-speech feature vector and the relationship feature vector according to the words to be input, the part-of-speech information of the words to be input, and the dependency relationship of the first word, and splicing the word feature vector, the part-of-speech feature vector and the relationship feature vector to obtain a first splicing feature vector;

inputting, through the embedding layer, the first splicing feature vector, the part-of-speech feature vector and the relationship feature vector into both the hidden layer and the self-attention mechanism layer;

determining, through the hidden layer, a first feature vector with the preset activation function according to the first splicing feature vector, the part-of-speech feature vector and the relationship feature vector, and inputting the first feature vector into the output layer;

determining, through the self-attention mechanism layer, a second feature vector according to the first splicing feature vector, the part-of-speech feature vector and the relationship feature vector, and inputting the second feature vector into the output layer; and outputting, through the output layer, the confidence levels, each corresponding to a respective one of the plurality of preset set update operations, according to the first feature vector and the second feature vector.

\* \* \* \* \*